United States Patent
Kallert et al.

(10) Patent No.: US 11,267,306 B2
(45) Date of Patent: Mar. 8, 2022

(54) VIBRATION DAMPER IN A WHEEL SUSPENSION OF A VEHICLE

(71) Applicant: Bayerische Motoren Werke Aktiengesellschaft, Munich (DE)

(72) Inventors: Jens Kallert, Hoerenzhausen (DE); Alfred Stenzenberger, Fuenfstetten (DE); Gerhard Zeller, Grafing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/805,568

(22) Filed: Feb. 28, 2020

(65) Prior Publication Data

US 2020/0198427 A1 Jun. 25, 2020

Related U.S. Application Data

(63) Continuation of application No. PCT/EP2018/068276, filed on Jul. 5, 2018.

(30) Foreign Application Priority Data

Aug. 30, 2017 (DE) ...................... 10 2017 215 112.9

(51) Int. Cl.
 *B60G 13/00* (2006.01)
 *B60G 7/00* (2006.01)
 *F16F 9/54* (2006.01)

(52) U.S. Cl.
 CPC ...... *B60G 13/005* (2013.01); *B60G 2204/129* (2013.01); *B60G 2204/41* (2013.01); *B60G 2206/82092* (2013.01)

(58) Field of Classification Search
 CPC ............ B60G 13/005; B60G 2204/129; B60G 2204/41; B60G 2206/82092;
 (Continued)

(56) References Cited

U.S. PATENT DOCUMENTS 5,000,429 A * 3/1991 Wittmar ............... B60G 15/068
                                                              267/141.3
5,192,100 A   3/1993 Rumpel et al.
(Continued)

FOREIGN PATENT DOCUMENTS

DE    32 13 657 A1   11/1982
DE    32 33 878 A1    3/1984
(Continued)

OTHER PUBLICATIONS

PCT/EP2018/068276, International Search Report dated Oct. 17, 2018 (Two (2) pages).
(Continued)

*Primary Examiner* — Jonathan Ng
*Assistant Examiner* — Daniel M. Keck
(74) *Attorney, Agent, or Firm* — Crowell & Moring LLP

(57) ABSTRACT

A vibration damper in a wheel suspension of a vehicle, which damper is supported on a wheel-guide element of the wheel suspension via two resilient bearings which are provided laterally of a damper tube of the vibration damper and which are diametrically opposed in relation to the damper tube. Each bearing has a rubber-elastic bearing element in which a damper receptacle is supported which is force-transmittingly connected to the damper tube. The damper receptacle is supported on the damper tube via a releasable securing element.

6 Claims, 2 Drawing Sheets

(58) Field of Classification Search
CPC ............ B60G 2204/43; B60G 2206/91; B60G 7/001; F16F 9/54
See application file for complete search history.

(56) References Cited

U.S. PATENT DOCUMENTS

| | | | |
|---|---|---|---|
| 10,427,484 B2 * | 10/2019 | Anderson | ............ B60G 15/067 |
| 2002/0074760 A1 | 6/2002 | Eshelman | |
| 2014/0374975 A1 * | 12/2014 | Matsushita | .......... B60G 13/003 |
| | | | 267/220 |
| 2020/0282787 A1 * | 9/2020 | Kieffer | ...................... F16F 9/54 |
| 2021/0291604 A1 * | 9/2021 | Jo | ........................ F16F 1/3732 |

FOREIGN PATENT DOCUMENTS

| | | | | |
|---|---|---|---|---|
| DE | 100 57 097 A1 | 5/2002 | | |
| DE | 102 47 503 A1 | 4/2004 | | |
| DE | 10 2005 013 374 A1 | 10/2006 | | |
| DE | 102015210151 A1 * | 12/2016 | ........... B60G 13/005 |
| EP | 1 036 677 B1 | 9/2000 | | |
| EP | 2955040 A2 * | 12/2015 | ............ B60G 7/008 |
| JP | 61-102302 A | 5/1986 | | |
| JP | 2004-3547 A | 1/2004 | | |
| KR | 20180068757 A * | 6/2018 | | |

OTHER PUBLICATIONS

German Search Report Issued in German application No. 10 2017 215 112.9 dated Feb. 5, 2021, with Statement of Relevancy (Twelve (12) pages).

* cited by examiner

VIBRATION DAMPER IN A WHEEL SUSPENSION OF A VEHICLE

CROSS REFERENCE TO RELATED APPLICATIONS

This application is a continuation of PCT International Application No. PCT/EP2018/068276, filed Jul. 5, 2018, which claims priority under 35 U.S.C. § 119 from German Patent Application No. 10 2017 215 112.9, filed Aug. 30, 2017, the entire disclosures of which are herein expressly incorporated by reference.

BACKGROUND AND SUMMARY OF THE INVENTION

The invention relates to a vibration damper in the wheel suspension of a vehicle, which damper is supported on a wheel-guide element of the wheel suspension via two elastic bearings which are provided laterally of a damper tube of the vibration damper and which are diametrically opposite one another in relation to this damper tube, and wherein each bearing has a rubber-elastic bearing element in which there is supported a damper receptacle which is in force-transmitting connection with the damper tube. With regard to the prior art, reference is made not only to EP 1 036 677 B1 but also to DE 102 47 503 B4.

Particularly to reduce the required installation height of vibration dampers supported on a wheel-guiding link, it is known that a bearing of the vibration damper, and customarily of the damper tube via which the bearing is supported on the wheel-guide element, such as, for example, a transverse link of a vehicle wheel suspension, can be provided not, as customary, below the damper tube or below a damper tube bottom part but laterally of the damper tube. With a view to as far as possible symmetrical loading and to avoid undesired tilting moments and transverse forces, preference is given here to providing two bearing points which are situated diametrically opposite one another in relation to the damper tube or its longitudinal axis. However, the known arrangement with screws which are to be fitted transversely to this longitudinal axis at each bearing point necessitates a relatively complicated assembly process.

Demonstrating a remedial measure for this highlighted problem is an object of the present invention.

The achievement of this object is obtained in that the damper receptacle is supported on the damper tube via a releasable securing element.

Instead of two screws, the present invention requires only a single releasable securing element which can also be mounted in a simpler manner than the known screws. In particular, this securing element can be applied as it were from below to the damper tube or be fastened to the lower bottom part of the damper tube. In order to allow an exchange of the vibration damper in the case of a defect, this securing element is configured to be releasable. For example, this securing element can be designed in the form of a screw nut which is screwed onto the (or a) damper tube or damper tube bottom part provided with a suitable thread, wherein the longitudinal axis of the thread of this screw nut coincides with the longitudinal axis of the damper tube. Should this securing element not be accessible in a simple manner, for example on account of the design of the wheel-guide element, it is also possible to provide this securing element, for example a screw nut, fixedly on the wheel-guide element and as it were to screw the vibration damper into this screw nut during assembly.

According to an advantageous embodiment, the damper receptacle can be supported between a so-called damper support, which is provided on the damper tube and configured in the manner of a collar or web, and the securing element releasably fastened to the damper tube or to a damper bottom portion, the securing element being in particular in the form of a screw nut screwed on the damper tube or the damper bottom. This annular damper support can be formed onto or into the damper tube or be, for example, welded onto the damper tube as a separate structure. During operation, the majority of the axial forces to be transmitted are transmitted via this damper support, to be precise in interaction with the damper receptacles which for their part are mounted in the elastic bearings in the wheel-guide element (for example transverse link). Each damper receptacle thus transmits the force to the associated bearing. The two aforementioned bearings can preferably be arranged in a cardanically reduced manner and for example in the leg of a wheel-guiding link, which can have a U-shaped cross section for example, or be pressed into in each case a bearing receptacle welded into the legs. These bearings thus also fix the damper receptacles in the link. The bearing receptacle for its part can be connected to the link in an integrally bonded or force-fitting manner.

What is to be understood by an aforementioned cardanically reduced arrangement is that the common axis of rotation of the two rubber bearings is normal to a plane which is formed by the axes of the damper tube in its two end positions, that is to say with minimum compression and with maximum rebound of a supporting spring element assigned to the vibration damper. The load on the rubber bearings in vehicle operation is thus kept as low as possible when a spring compression and rebound occurs or the damper, or to be more precise damper piston, is situated at and between its two end positions, namely at the tension stop or at the compression stop.

According to an advantageous embodiment, the damper receptacles of the two bearings can be combined to form a structural unit which is plugged onto the damper tube by an annular portion. On the one hand, this reduces the assembly effort; in particular, however, such a structural unit can optimally guide the vibration damper or the damper tube when mounting the damper on the link or wheel-guide element. However, it may be required when using such a structural unit to configure the wheel-guide element, for example a link, to the effect that such a structural unit can be inserted in a simple manner, wherein this insertion can occur in a relatively simple manner at first without the supporting elastic bearings. The latter can then be pressed in from outside. Alternatively, that is to say for example in the case of a simple link of U-shaped cross section in whose legs there are provided, for example, circular apertures for receiving the bearings which support the damper receptacles, a dedicated damper receptacle can also be inserted for each bearing, which damper receptacles, given a suitable design, supplement one another in the installed state in a separating joint to give a body which forms a structural unit in a form-fitting manner.

Other objects, advantages and novel features of the present invention will become apparent from the following detailed description of one or more preferred embodiments when considered in conjunction with the accompanying drawings.

In the text which follows, the invention will be explained further by way of an exemplary embodiment.

DETAILED DESCRIPTION OF THE DRAWINGS

Figure 1:
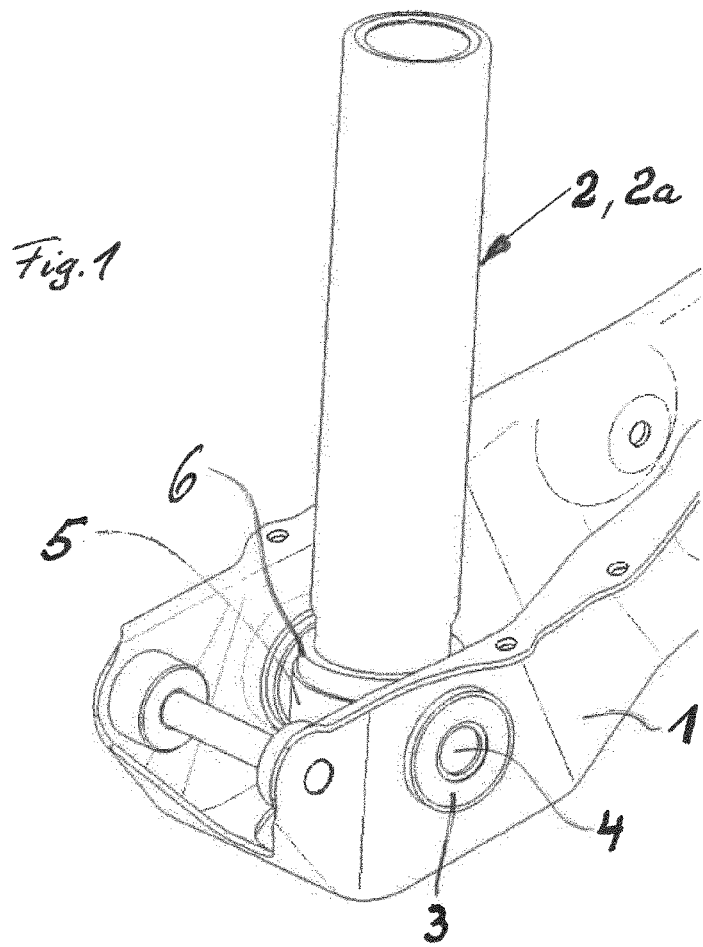
FIG. 1 is an isometric illustration showing the lower portion of a vibration damper in the installed state in the vehicle, the damper being supported or mounted according to the invention in a wheel-guiding transverse link having an at least approximately U-shaped cross section.
Figure 2:
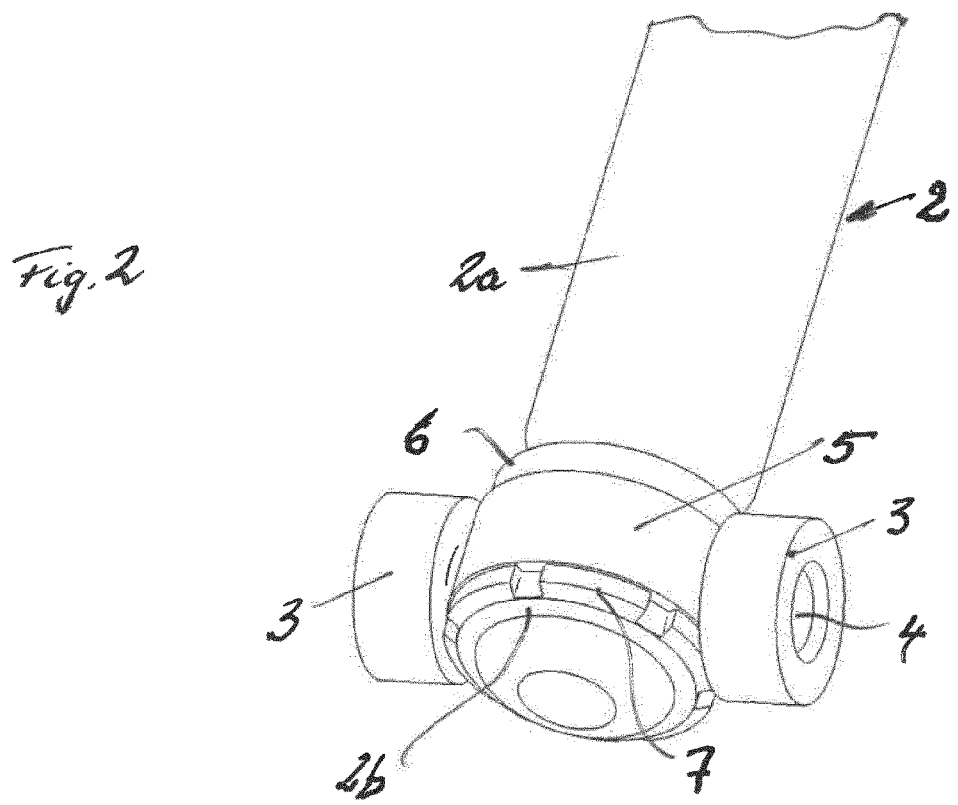
FIG. 2 is another isometric illustration showing the lower vibration damper portion with the two elastic bearings without wheel-guiding link, wherein this combination of components on its own is not present since—as described—the damper is inserted into the wheel-guiding link only when the damper receptacles with the bearings are already mounted in the link.

The reference number 1 denotes the aforementioned and here cross-sectionally approximately U-shaped wheel-guiding link, also termed wheel-guiding element 1, whereas a or the vibration damper in the wheel suspension or wheel guide of a vehicle wheel (for example of a two-track motor vehicle) bears the reference number 2. Of this vibration damper 2, or for short damper 2, there can be seen not only the customary damper tube 2a, in which a damper piston (not visible) is guided in a displaceable manner, but also the bottom part 2b of the damper tube 2a. This vibration damper 2, whose longitudinal axis is denoted by the reference number 2c, is, as described above, mounted in the link 1 via elastic bearings 3, for which purpose in each case a bearing receptacle 3a is inserted or pressed into a suitable aperture in a leg of the link 1, and for which purpose in each case an annular elastic rubber bearing element 3b is pressed into each bearing receptacle 3a. Also illustrated here is a bearing inner ring 3c. As a departure from the present illustration, the annular elastic rubber element itself can also be surrounded by an outer ring and inner ring (not shown here), in which case the bearing inner ring 3c shown here can be dispensed with.

In each rubber bearing element 3b in its circular cylindrical cavity there is mounted here, with the interposition of the bearing inner ring 3c, a so-called damper support 4 which first extends as a short circular cylindrical shaped body out of the bearing 3 in the direction of the damper longitudinal axis 2c. There is provision here that the two damper receptacles 4 are combined in an annular connecting portion 5 which surrounds the damper tube 2a. Thus, the two damper receptacles 4, together with the annular connecting portion 5, form a structural unit or an intrinsically coherent component. In the exemplary embodiment, the annular connecting portion 5 on the damper tube 2a, as viewed in the direction of the damper longitudinal axis 2c, is clamped in between a damper support 6 and a releasable securing element 7 which are each connected in a force-transmitting manner to the damper tube 2a. Here, the annular damper support 6 is welded to the damper tube 2a, whereas the here likewise annular securing element 7 is designed in the form of a screw nut 7 which is screwed onto a thread provided on the damper tube 2a or on the bottom part 2b of the damper 2.

Figure 3:
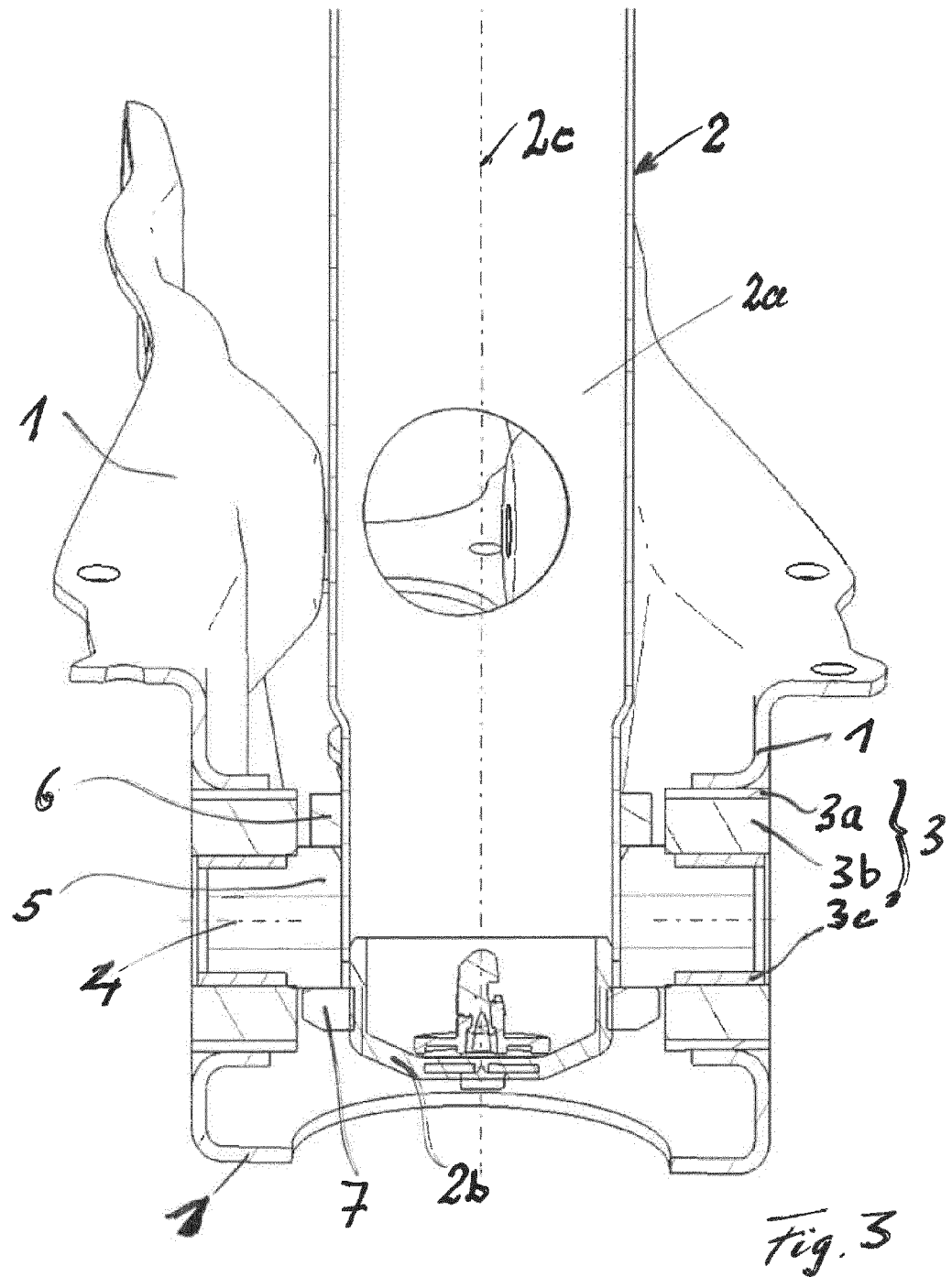
FIG. 3 shows in principle the damper bearing arrangement in the link in section in view X from FIG. 1, that is to say in a view in the longitudinal direction of the link, which in the present case corresponds to a view approximately in the vehicle transverse direction, since the wheel-guiding link is a transverse link. A circular aperture in the damper tube that is not present in reality affords here a through-view of a link portion situated behind.

Since, in a vibration damper 2 supported on a wheel-guiding link 1, the bearings 3 are provided laterally of the damper tube 2a of the damper, the installation space requirement as viewed in the direction of the damper longitudinal axis 2c is minimized. The vibration damper 2 can be mounted on the link 1 in a simple manner here. All that is required is for the vibration damper 2 to be inserted from above between the damper receptacles 4 premounted in the link 1 into the diameter-adapted connecting portion 5, after which the screw nut 7 in the illustration of FIG. 3 is applied from below and tightened. With a view to this, the link 1 is suitably configured in this portion, that is to say has (as shown in FIG. 3) a relatively large circular aperture in the base of the U-shaped cross section (as viewed in the length of the link 1) at the height of the screw nut 7. The screw nut 7 can be screwed through this aperture onto the damper bottom part 2b. Furthermore, it should be explained how the structural unit is mounted with/by the two damper receptacles 4 and the annular connection portion 5, namely in that this structural unit, first without the two rubber bearing elements 3b being mounted, is threaded from the open side of the U-shaped link 1—and thus from above in FIG. 3—into the circular cylindrical bearing receptacles 3a which are welded beforehand into the lateral legs of the link. After threading-in has occurred, the (hollow cylindrical) rubber bearing elements 3b can then be pressed with the respective bearing inner ring 3c into the bearing receptacles 3a such that they surround and thus support the short circular cylindrical shaped bodies or stubs of the damper receptacles 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vibration damper in a wheel suspension of a vehicle, comprising:
   a damper tube; and
   two elastic bearings, wherein the vibration damper is supported on a wheel-guide element of the wheel suspension via the two elastic bearings, wherein the two elastic bearings are disposed laterally of the damper tube and are diametrically opposite one another in relation to the damper tube, and wherein each of the two elastic bearings has a respective rubber-elastic bearing element in which there is supported a respective damper receptacle which is in force-transmitting connection with the damper tube;
   wherein each respective damper receptacle is supported on the damper tube via a single releasable securing element wherein the single releasable securing element is not a screw and is an annular screw nut.

2. The vibration damper according to claim 1, wherein each damper receptacle is supported between a damper support, which is disposed on the damper tube and is configured as a collar or a web, and the single releasable securing element, which is releasably fastened to the damper tube or to a damper bottom portion.

3. The vibration damper according to claim 1, wherein the single releasable securing element is screwed onto a thread which is disposed on the damper tube or a damper tube bottom part and wherein a longitudinal axis of a thread of the screw nut coincides with a longitudinal axis of the damper tube.

4. The vibration damper according to claim 1, wherein the respective damper receptacles of the two elastic bearings are combined to form a structural unit which is plugged onto the damper tube by an annular connecting portion.

5. The vibration damper according to claim 1, wherein the rubber-elastic bearing elements are surrounded by respective bearing receptacles which are connected to the wheel-guide element in a force-fitting or integrally bonded manner.

6. The vibration damper according to claim 1, wherein a common axis of rotation of the two elastic bearings is normal to a plane which is formed by axes of the damper tube in its two end positions.

\* \* \* \* \*